March 17, 1925.  1,530,290
J. BIERMANNS
PROTECTIVE DEVICE
Filed April 8, 1924
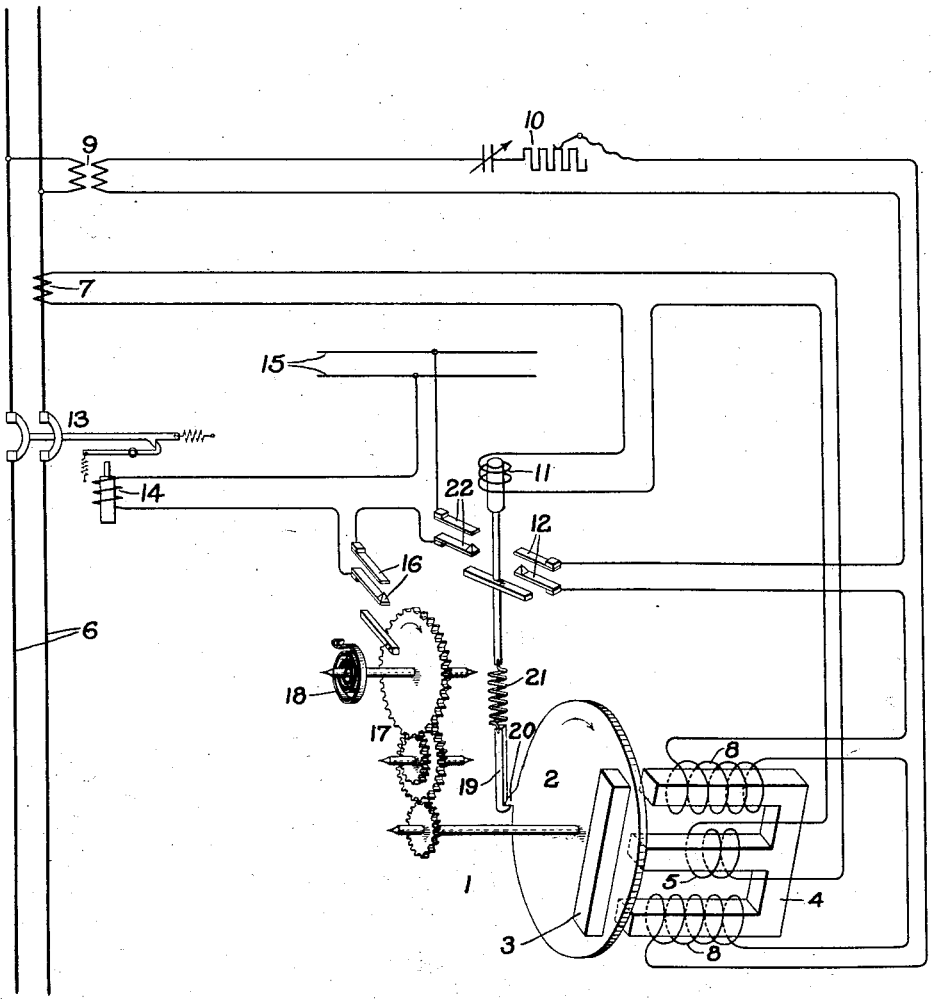
Inventor:
Josef Biermanns,
by
His Attorney.

Patented Mar. 17, 1925.

1,530,290

UNITED STATES PATENT OFFICE.

JOSEF BIERMANNS, OF KARLSHORST, GERMANY, ASSIGNOR TO GENERAL ELECTRIC COMPANY, A CORPORATION OF NEW YORK.

PROTECTIVE DEVICE.

Application filed April 8, 1924. Serial No. 705,114.

*To all whom it may concern:*

Be it known that I, JOSEF BIERMANNS, a citizen of Germany, residing at Karlshorst, Germany, have invented certain new and useful Improvements in Protective Devices, of which the following is a specification.

My invention relates to improvements in protective devices and the protection of electric systems and more particularly to improvements in protective relays which are operative in response to a fault causing an excess current condition and which have a discriminating action dependent upon the fault voltage and current of the system. An object of my invention is to provide an improved protective relay responsive to abnormal conditions such as excess current with a discriminating time and directive action dependent upon the voltage and current of the circuit in order selectively to control a faulty section of an electric system without interrupting service on the sound sections. Another object of my invention is to provide an improved protective relay which has a discriminating time action dependent upon the impedance and a component of the impedance of an electric system between the relay location and a fault causing an excess current.

My invention will be better understood from the following description taken in connection with the accompanying drawing and its scope will be pointed out in the appended claims.

The single figure of the accompanying drawing illustrates partly in diagram and perspective an embodiment of my invention, which in general comprises a power time relay 1 having directional characteristics and having a movable contact controlling member 2 arranged to be actuated by a torque proportional to either the effective power or the reactive component thereof flowing into the line section to be disconnected and to be retarded by a damping action proportional to the square of the line voltage and the angular velocity of the movable member. The actuating or driving element may be either a dynamometer relay or an induction disk relay connected and arranged to exert on the movable member a torque proportionate to EI cos ⊙, E and I being the line voltage and current respectively and ⊙ the phase angle between them. In some cases, it may be desirable, particularly if the relay is used on overhead lines, to make the torque proportional to EI sin ⊙. The retarding or damping element may be an induction disk rotatable between the poles of an electromagnet energized by the line voltage and arranged relatively to the movable contact controlling member so that the retardation imposed thereon is proportional to the square of the line voltage and the angular velocity of the movable member. Upon the occurrence of an excess current, the movable member then attains, disregarding friction and other losses, such an angular velocity $w$ that the driving torque $kEI \cos \Theta$ or $mEI \sin \Theta$ and the retardation or damping effect, $nE^2w$ are balanced, that is, $nE^2w = kEI \cos \Theta$ or $nE^2w = mEI \sin \Theta$, $k$, $m$ and $n$ being constants. These equations, when solved for angular velocity give, $$w = \frac{kI \cos \theta}{nE}$$

or $$w = \frac{mI \sin \theta}{nE}.$$

Since $$\frac{I \cos \theta}{E} = \frac{R}{Z^2}$$

and $$\frac{I \sin \theta}{E} = \frac{X}{Z^2},$$

R and X being respectively the resistance and reactance and Z the impedance of the line between the relay location and the fault point, there results by substitution $$w = \frac{kR}{nZ^2}$$

or $$w = \frac{mX}{nZ^2},$$

that is to say the angular velocity is directly proportional to either the resistance or the reactance and inversely proportional to the square of the impedance of the line between the relay location and the fault point. Inasmuch as the time required to move the member 2 to contact controlling position is inversely proportional to the angular velocity of the member, it follows that the time action of the relay is directly proportional to the square of the impedance of the line between the relay location and the fault point and inversely proportional to a component of the impedance.

A particularly simple construction may be obtained by making the selective relay 1 of the induction disk type as the angular velocity of the movable member or disk 2 can be regulated substantially solely by the electromagnetic driving mechanism and by the damping effected by the fluxes in the cores thereof thus combining in a single device the desired driving and retardation effects.

The electromagnetic driving mechanism comprises magnetic members 3 and 4 between which the disk 2 is interposed so as to be movable across the magnetic field of two fluxes which are displaced in phase and which exert a torque on the disk 2 in a well known manner. The magnetic member 4 may comprise a plurality of legs, three for example, one of which is provided with an energizing winding 5 connected in series relation with the line 6 through a current transformer 7. The other legs are provided with an energizing winding 8 arranged to be connected in shunt relation with the line 6 through a potential transformer 9. Suitable phase displacing means as shown at 10 may be connected in circuit with the winding 8.

With this arrangement, the disk 2 will be actuated in accordance with the amount and direction of the line power and by the word power as used in the claims I wish it to be understood that I mean either effective power or the reactive component thereof. However, as the normal full load line power may be greater than the power during an excess current condition, it is preferably under normal conditions to prevent movement of the member 2. This may be done by arranging the winding 8 so that it is normally deenergized and is arranged to be energized upon the occurrence of an excess current condition. For this purpose, I may provide an over-current relay 11 arranged to control contacts 12 in the circuit of the voltage winding 8.

In order that the damping action on the disk 2 of the flux produced by the current winding 5 may be relatively small, even at high current values, as compared with the damping action of the voltage winding 8, these windings have relatively few and many turns respectively and are arranged relatively to their respective magnetic circuits so that these circuits are energized below the saturation point irrespective of line voltage and current and the flux produced by the voltage winding preponderates in the damping action.

For controlling the line 6 suitable circuit interrupting means such as a circuit breaker 13 is provided. The circuit breaker 13 may be provided with electromagnetic tripping means 14 arranged to be energized from a control bus 15 when the relatively movable cooperating contacts 16 are closed upon movement of the disk 2 to circuit controlling position. The disk 2 may be arranged to control the contacts 16 through a suitable reduction gearing 17 and is biased to the position shown in the drawing by any suitable means such as a relatively light spring 18.

The equations deduced for the time action of the selective relay apply only to the running conditions and do not take into account the inertia or the parts to be actuated. This inertia tends to make the time action different from that desired. In order to overcome this tendency, the over-current relay 11 may be arranged upon actuation to assist the electromagnetic driving means by imparting to the disk 2 a suitable predetermined velocity. For this purpose, the over-current relay may be provided with a coupling such as an arm 19 arranged normally to engage a projection 20 on the disk 2 so that upon actuation of the over-current relay 11 an impulse is imparted to the disk 2 tending to turn it in contact controlling direction. The arm 19 may be rigidly associated with the armature of the over-current relay 11 or resiliently through a connecting spring 21. The auxiliary rotating force imparted to the disk 2 by the over-current relay 11 is then dependent on or independent of the current according to whether the coupling is rigid or resilient.

My invention is of particular advantage in a system wherein a plurality of relays and circuit breakers are arranged at intervals along the length of the line or circuit to be protected. When a fault occurs on the system, it is desirable to trip out the circuit breaker nearest the fault. The other circuit breakers should not open. The voltage of the line is, of course, lowest near the fault point and is higher the greater the distance from the point of fault toward the point at which the circuit is supplied. When, for example, a short circuit occurs on the line, the over-current relay 11 in each line section immediately completes the circuit of the voltage winding 8 of the corresponding power relay. All of the power relays start their respective contact controlling disks into operation, but the relays nearest the fault point will operate more rapidly than the relays more remote from the fault point and consequently the circuit breaker nearest the fault will open first. Since the retarding effect exerted on the various relays is proportional to the square of the voltage and since the voltage rises with the remoteness from the fault, it is apparent that a sensitive selective action is obtained. As soon as the circuit breaker adjacent the fault opens, the current is reduced in the line between that circuit breaker and the source of supply. The restoring springs or equivalent means on the remaining relays of this line therefore tend to return the relays to normal position. Although the moving elements of the relays do not have great inertia, it may happen that they may turn a slight extent after the circuit breaker adjacent the fault is opened. In order to prevent such continued rotation from permitting one or more of the other relays near the fault from tripping out their circuit breakers, it is desirable to arrange the current responsive relays 11 to prevent such action. As shown in the drawing, the relays 11 are arranged to control contacts 22 in series with the contacts 16 operated by the power elements. As soon as the circuit breaker nearest the fault opens, the relays 11 open their contacts very quickly and, even if the power elements of other relays should continue their rotation far enough to close the contacts 16, the operation of any additional circuit breaker is prevented.

As heretofore set forth, the time of operation of the relay may be made proportional to either $\frac{Z^2}{R}$ or $\frac{Z^2}{X}$. A wide field of choice exists for design of the relay to accomplish results which may be desired in any particular case. This will be obvious to those skilled in the art to which my invention relates. If, for example, the constants of the particular line to be controlled are assumed to be such that the power factor for an average fault is about 70 per cent, the resistance and reactance of the circuit will be substantially equal. The formulæ $\frac{Z^2}{R}$ and $\frac{Z^2}{X}$ may be written $$\frac{R^2+X^2}{R}$$

and $$\frac{R^2+X^2}{X}.$$

From this it will be seen that the time of operation, in the example assumed, may be made proportional to 2R or 2X; that is, proportional to twice the resistance or reactance of the line between the relay and the point of fault. The relay may be designed in this case to exert its maximum torque at about 70 per cent power factor. Even though the power factor of the circuit should vary somewhat from the assumed 70 per cent the relay will still exert a strong torque and operate in substantially the desired predetermined time interval.

In some systems, the reactance will be the more stable component of the line impedance and the relay will preferably in such case be designed to operate in accordance with the reactive component of the power. This will generally be the case in overhead installations. In other systems, the resistance of the line may be the more stable component and in such case the relay will be arranged to operate in accordance with the effective power. This will frequently be the case in underground installations. Any given relay may be adjusted for either condition of operation by varying the phase of the current in the voltage winding with respect to the assumed phase of the current in the current winding by adjustment of the phase regulating means 10.

It will be apparent to those skilled in the art that many modifications and variations may be made within the scope of my invention which is not limited to the particular construction of relay disclosed and I, therefore, aim in the appended claims to cover all such modifications and variations as fall within the true spirit and scope of my invention.

What I claim as new and desire to secure by Letters Patent of the United States, is:

1. In combination with an electric power line and circuit interrupting means therefor, means for controlling said interrupting means upon the occurence of a line fault causing an excess current condition comprising relatively movable cooperating contacts, a power directional relay connected to be actuated in accordance with the power of the circuit and comprising a movable member for controlling said contacts and means for exerting on said member a retarding action dependent on the square of the line voltage at the relay location and the speed of the member, whereby the time for actuating said contacts is dependent on the line impedance and a component thereof between the fault point and the relay location.

2. In combination with an electric power line and circuit interrupting means therefor, means for controlling said interrupting means upon the occurrence of a line fault causing an excess current condition comprising relatively movable cooperating contacts, a power directional relay connected to be actuated in accordance with the power of the circuit and comprising a movable member for controlling said contacts and means for exerting on said member a retarding effect dependent on the square of the line voltage at the relay location and the speed of the member, whereby the time for actuating said contacts is dependent on the line impedance and a component thereof between the fault point and the relay location, and means comprising an over-current relay connected to be actuated upon the occurrence of an excess current condition and arranged upon actuation to tend to move said member in contact controlling direction.

3. In a protective system of the class described wherein a relay is arranged to control contacts in accordance with predetermined conditions in a circuit to be protected and wherein the relay is rotated by windings connected to the circuit to be controlled, the combination with said relay of means responsive to a predetermined current in the line for imparting a starting impulse to the relay.

4. In a system of the class described, an electric power circuit, means for controlling said circuit, comprising a circuit controlling relay comprising a rotatable element and means for rotating said element comprising current and voltage windings connected and arranged to operate said element in accordance with the power in said circuit, and means for adjusting the phase relationship between the currents in said current and voltage windings to secure operation in accordance with either the effective power or the reactive component of the power in said circuit.

5. A protective system of the class described comprising an electric power circuit, means for controlling said circuit comprising a circuit controlling retarded relay, said relay comprising a rotatable element and means for operating the same comprising a winding connected to be responsive to the voltage of said circuit and a winding responsive to the current in said circuit, characterized by the fact that said windings are arranged upon a magnetic structure operated below saturation and by the fact that said windings are proportioned so as to produce a time of operation proportional to the square of the impedance of said circuit and inversely proportional to a component of the impedance.

6. A retarded relay of the class described comprising a rotatable element and means for rotating said element comprising a magnetic structure, an alternating current voltage responsive winding and an alternating-current current responsive winding arranged on said magnetic structure, characterized by the fact that the magnetic structure is operated below saturation and arranged so that a driving torque is exerted on said element substantially proportional to the product of the currents in said current and voltage windings, and by the fact that said windings are so proportioned that a retarding effect is exerted on said element proportional to the square of the voltage applied to the voltage winding, the retarding effect exerted on said element by the current winding being relatively small compared to the retarding effect exerted by said voltage winding.

7. In combination with an electric power line and circuit interrupting means therefor, means for controlling said interrupting means upon the occurrence of a line fault causing an excess current condition comprising relatively movable cooperating contacts, a power directional relay comprising a rotatable conducting member for actuating said contacts, and electromagnetic means for actuating said member inductively associated therewith and comprising a plurality of magnetic circuits, one of said circuits being provided with a winding connected in series relation with said line and arranged to produce a relatively small flux and another of said circuits being provided with a normally deenergized winding arranged to be connected in shunt relation with said line upon the occurrence of an excess current condition and to produce a relatively large flux, said electromagnetic means being arranged to exert on said member a magnetic damping action dependent on the square of the line voltage at the relay location and the velocity of the member whereby the member is moved to contact controlling position in accordance with the amount and direction of line power in a time proportional to the line impedance and a component thereof between the fault point and the relay location, and an over-current relay for effecting the energization of said normally deenergized winding upon the occurrence of an excess current.

8. In combination with an electric power line and circuit interrupting means therefor, means for controlling said interrupting means upon the occurrence of a line fault causing an excess current condition comprising relatively movable cooperating contacts, a power directional relay comprising a rotatable conducting member for actuating said contacts and electromagnetic means for actuating said member inductively associated therewith and comprising a plurality of magnetic circuits, one of said circuits being provided with a current winding in series relation with said line and arranged to produce a relatively small flux and another of said circuits being provided with a normally deenergized voltage winding arranged to be connected in shunt relation with said line and to produce a relatively large flux, said electromagnetic means being arranged when said voltage winding is energized to exert on said member a magnetic damping action dependent on the square of the line voltage at the relay location and the velocity of the member whereby the member is moved to contact controlling position in accordance with the amount and direction of line power in a time proportional to the line impedance and a component thereof between the fault point and the relay location, and an overcurrent relay connected to be actuated upon the occurrence of an excess current condition and arranged upon actuation to complete the circuit of said voltage winding and to tend to move said member in contact controlling direction.

In witness whereof, I have hereunto set my hand this 13th day of March, 1924.

JOSEF BIERMANNS.